United States Patent [19]
Gan et al.

[11] Patent Number: 6,153,338
[45] Date of Patent: Nov. 28, 2000

[54] NONAQUEOUS ORGANIC ELECTROLYTES FOR LOW TEMPERATURE DISCHARGE OF RECHARGEABLE ELECTROCHEMICAL CELLS

[75] Inventors: Hong Gan; Esther S. Takeuchi, both of East Amherst, N.Y.

[73] Assignee: Wilson Greatbatch Ltd., Clarence, N.Y.

[21] Appl. No.: 09/133,799

[22] Filed: Aug. 13, 1998

Related U.S. Application Data

[60] Provisional application No. 60/065,532, May 13, 1998.

[51] Int. Cl.[7] .................................................. H01M 6/16
[52] U.S. Cl. ......................... 429/326; 429/324; 429/327; 429/330; 429/336; 429/338; 429/342; 429/231.95; 252/62.2
[58] Field of Search ................................. 429/338, 342, 429/343, 332, 326, 324, 330, 331, 336, 231.95, 231.4; 252/62.2; 256/62.2

[56] References Cited

U.S. PATENT DOCUMENTS

| | | | |
|---|---|---|---|
| 4,957,833 | 9/1990 | Daifuku et al. | 429/197 |
| 5,292,601 | 3/1994 | Sugeno et al. | 429/197 |
| 5,478,673 | 12/1995 | Funatsu | 429/197 |
| 5,856,043 | 1/1999 | Ohsaki et al. | 429/218 |
| 5,962,720 | 10/1999 | Gan et al. | 558/277 |
| 6,007,947 | 12/1999 | Mayer | 429/231.1 |

*Primary Examiner*—Maria Nuzzolillo
*Assistant Examiner*—Angela J. Martin
*Attorney, Agent, or Firm*—Hodgson Russ Andrews Woods & Goodyear LLP

[57] ABSTRACT

An alkali metal secondary electrochemical cell, and preferably a lithium ion cell, activated with a quaternary solvent system, is described. The solvent system comprises a quaternary mixture of dialkyl carbonates and cyclic carbonates, and preferably dimethyl carbonate, diethyl carbonate, ethylmethyl carbonate and ethylene carbonate. Lithium ion cells activated with this electrolyte have good room temperature cycling characteristics and excellent low temperature discharge behavior.

1 Claim, 6 Drawing Sheets

NONAQUEOUS ORGANIC ELECTROLYTES FOR LOW TEMPERATURE DISCHARGE OF RECHARGEABLE ELECTROCHEMICAL CELLS

CROSS-REFERENCE TO RELATED APPLICATION

The present application claims priority based on U.S. provisional application Ser. No. 60/085,532, filed May 13, 1998.

BACKGROUND OF INVENTION

1. Field of the Invention

The present invention generally relates to the conversion of chemical energy to electrical energy, and more particularly, to a nonaqueous electrolyte activating a rechargeable alkali metal electrochemical cell, particularly a lithium ion cell, designed for long cycle life and low temperature charge/discharge applications.

2. Prior Art

Lithium ion cells activated with carbonate based electrolytes are known to deliver more than 1,000 charge/discharge cycles at room temperature. However, the poor discharge or cycling behavior of such cells at low temperatures, i.e., temperatures <-20° C., remains a vexing challenge with this technology. One of the biggest contributors to this problem is the poor conductivity of typically used organic carbonate electrolyte systems which freeze at temperatures below -10° C. For example, an electrolyte consisting of 1.0M $LiPF_6$ dissolved in a mixture, by volume, of EC:DMC=30:70 has a freezing point of -11° C. (see electrolyte 9 in Example II); and electrolytes consisting of 1.39M $LiPF_6$ dissolved in a mixture, by volume, of EC:DEC=50:50 to 25:75 have freezing points higher than -15° C. (as reported by S. T. Mayer et al.). As a result, lithium ion cells activated with binary carbonate electrolytes can not be effectively charge/discharge cycled at temperatures below -15° C.

One solution to this problem is to provide an electrolyte containing organic solvent constituents in addition to the carbonates. For example, lithium ion cells activated with electrolytes containing an organic ester co-solvent are known to exhibit good low temperature discharge performance, (S. T. Mayer, H. C. Yoon, C. Bragg, and J. H. Lee of PolyStor Corporation, presentation at *The Thirteenth International Seminar on Primary and Secondary Battery Technology and Application*, Mar. 4–7, 1996, Boca Raton, Fla.; E. J. Plichta, S. Slane, *Journal of Power Sources* 69, 41–45, 1997; Y. Ein-Eli, S. R. Thomas, R. Chadha, T. J. Blakley, and V. R. Koch, *J. Electrochem. Soc.*, 144, 823–829, 1997). Further, U.S. Pat. No. 5,256,504 to Okuno et al. describes a mixed solvent electrolyte of ethylene carbonate (EC) and the esters methyl acetate and methyl propionate for activating lithium ion cells. This solvent system exhibits improved low temperature (-10° C.) discharge performance relative to cells activated with electrolytes composed of an EC and DEC mixed solvent system. Many other researchers also report similar observations when an organic ester solvent is used as a co-solvent with an organic carbonate. However, while mixed carbonate and ester solvent system electrolytes present higher conductivity at low temperatures than conventional carbonate based electrolytes, organic esters are known to have generally low melting points and low viscosities.

Furthermore, while lithium ion cells activated with electrolytes containing an organic ester as a co-solvent are known to exhibit improved low temperature discharge performance, this is achieved at the expense of the cell's cycle life. When cycled at room temperature, lithium ion cells activated with an electrolyte containing an organic ester as a co-solvent exhibit significantly higher capacity fade than cells having a similar electrode couple activated with an electrolyte containing only organic carbonate solvents. This detrimental effect is probably due to the oxidative instability of organic esters in the presence of high voltage cathode materials.

According to the present invention, low temperature discharge and capacity fade problems are avoided by activating an alkali metal rechargeable cell, and particularly a lithium ion cell, with a quaternary mixture of organic carbonate solvents in the electrolyte. The carbonate solvents comprising the quaternary mixture and the solvent mixture ratio are carefully selected to provide a lithium ion cell capable of discharge at temperatures below -20° C. and that exhibits good cycling characteristics. At the same time, the cycleability of the present invention cells at room temperature is maintained as good as rechargeable cells of a similar electrode chemistry activated with the conventional binary carbonate solvent electrolytes.

SUMMARY OF THE INVENTION

The object of the present invention is, therefore, to improve the low temperature charge/discharge performance of lithium ion cells by activating them with an electrolyte comprising a new quaternary mixture of nonaqueous organic carbonate solvents. A further objective of the present invention is to provide such electrolytes in lithium ion cells to improve their cycle life in comparison to cells of a similar electrode chemistry activated with conventional binary carbonate and mixed carbonate/ester electrolytes.

For that purpose, the present invention is directed to a quaternary mixed solvent system for an electrolyte activating a lithium ion cell, wherein the solvent system contains only organic carbonates. In particular, the preferred solvent mixture is EC:DMC:EMC:DEC, in which EC is in the range of about 10 to 50%, DMC is in the range of about 5 to 75%, EMC is in the range of about 5 to 50% and DEC is in the range of about 3 to 45%, by volume. This solvent system provides the cell with good low temperature discharge and cycling characteristics.

These and other objects of the present invention will become increasingly more apparent to those skilled in the art by reference to the following description and to the appended drawings.

DETAILED DESCRIPTION OF THE DRAWINGS

DETAILED DESCRIPTION OF THE PREFERRED EMBODIMENTS

A secondary electrochemical cell constructed according to the present invention includes an anode active material selected from Groups IA, IIA, or IIIB of the Periodic Table of Elements, including the alkali metals lithium, sodium, potassium, etc. The preferred anode active material comprises lithium.

In secondary electrochemical systems, the anode electrode comprises a material capable of intercalating and de-intercalating the alkali metal, and preferably lithium. A carbonaceous anode comprising any of the various forms of carbon (e.g., coke, graphite, acetylene black, carbon black, glassy carbon, etc.) which are capable of reversibly retaining the lithium species, is preferred. Graphite is particularly preferred due to its relatively high lithium-retention capacity. Regardless of the form of the carbon, fibers of the carbonaceous material are particularly advantageous because the fibers have excellent mechanical properties which permit them to be fabricated into rigid electrodes that are capable of withstanding degradation during repeated charge/discharge cycling. Moreover, the high surface area of carbon fibers allows for rapid charge/discharge rates. A preferred carbonaceous material for the anode of a secondary electrochemical cell is described in U.S. Pat. No. 5,443,928 to Takeuchi et al., which is assigned to the assignee of the present invention and incorporated herein by reference.

A typical secondary cell anode is fabricated by mixing about 90 to 97 weight percent graphite with about 3 to 10 weight percent of a binder material which is preferably a fluoro-resin powder such as polytetrafluoroethylene (PTFE), polyvinylidene fluoride (PVDF), polyethylenetetrafluoroethylene (ETFE), polyamides and polyimides, and mixtures thereof. This electrode active admixture is provided on a current collector such as of a nickel, stainless steel, or copper foil or screen by casting, pressing, rolling or otherwise contacting the active admixture thereto.

The anode component further has an extended tab or lead of the same material as the anode current collector, i.e., preferably nickel, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The cathode of a secondary cell preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

Before fabrication into an electrode for incorporation into an electrochemical cell, the lithiated active material is preferably mixed with a conductive additive. Suitable conductive additives include acetylene black, carbon black and/or graphite. Metals such as nickel, aluminum, titanium and stainless steel in powder form are also useful as conductive diluents when mixed with the above listed active materials. The electrode further comprises a fluoro-resin binder, preferably in a powder form, such as PTFE, PVDF, ETFE, polyamides and polyimides, and mixtures thereof.

To discharge such secondary cells, the lithium ion comprising the cathode is intercalated into the carbonaceous anode by applying an externally generated electrical potential to recharge the cell. The applied recharging electrical potential serves to draw the alkali metal ion from the cathode material, through the electrolyte and into the carbonaceous anode to saturate the carbon comprising the anode. The resulting $Li_xC_6$ electrode can have an x ranging between 0.1 and 1.0. The cell is then provided with an electrical potential and is discharged in a normal manner.

An alternate secondary cell construction comprises intercalating the carbonaceous material with the active alkali material before the anode is incorporated into the cell. In this case, the cathode body can be solid and comprise, but not be limited to, such materials as manganese dioxide, silver vanadium oxide, copper silver vanadium oxide, titanium disulfide, copper oxide, copper sulfide, iron sulfide, iron disulfide and fluorinated carbon. However, this approach is compromised by the problems associated with handling lithiated carbon outside of the cell. Lithiated carbon tends to react with explosive results when contacted by air.

The secondary cell of the present invention includes a separator to provide physical segregation between the anode and cathode active electrodes. The separator is of an electrically insulative material to prevent an internal electrical short circuit between the electrodes, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. The form of the separator typically is a sheet which is placed between the anode and cathode electrodes. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

Illustrative separator materials include fabrics woven from fluoropolymeric fibers of polyethylenetetrafluoroethylene and polyethylenechlorotrifluoroethylene used either alone or laminated with a fluoropolymeric microporous film. Other suitable separator materials include non-woven glass, polypropylene, polyethylene, glass fiber materials, ceramics, a polytetraflouroethylene membrane commercially available under the designation ZITEX (Chemplast Inc.), a polypropylene membrane commercially available under the designation CELGAD (Celanese Plastic Company, Inc.) and a membrane commercially available under the designation DEXIGLAS (C. H. Dexter, Div., Dexter Corp.).

The choice of an electrolyte solvent system for activating an alkali metal electrochemical cell, and particularly a fully charged lithium ion cell is very limited due to the high potential of the cathode material (up to 4.3V vs. $Li/Li^+$ for $Li_{1-x}CoO_2$) and the low potential of the anode material (0.01V vs. $Li/Li^+$ for graphite). According to the present invention, suitable nonaqueous electrolytes are comprised of an inorganic salt dissolved in a nonaqueous solvent and more preferably an alkali metal salt dissolved in a quaternary mixture of organic carbonate solvents comprising dialkyl (non-cyclic) carbonates selected from dimethyl carbonate (DMC), diethyl carbonate (DEC), dipropyl carbonate (DPC), ethylmethyl carbonate (EMC), methylpropyl carbonate (MPC) and ethylpropyl carbonate (EPC), and mixtures thereof, and a cyclic carbonate selected from propylene carbonate (PC), ethylene carbonate (EC), butylene carbonate (BC) and vinylene carbonate (VC), and mixtures thereof. Organic carbonates are generally used in the electrolyte solvent system for such battery chemistries because they exhibit high oxidative stability toward cathode materials and good kinetic stability toward anode materials. Table 1 lists physical properties of these carbonate solvents.

TABLE 1

| Solvent | MP (° C.) | BP (° C.) | ε (25° C.) | η (cP, 20° C.) |
|---|---|---|---|---|
| EC | 36.4 | 238 | 95.3 | 1.85 (40° C.) |
| PC | −54.5 | 242 | 64.4 | 2.51 |
| BC | −53 | 240 | 53 | 3.2 |
| VC | 22 | 162 | — | — |
| DMC | 3 | 90 | 3.12 | 0.59 |
| EMC | −55 | 109 | — | 0.66 (25° C.) |
| DEC | −43 | 127 | 2.82 (20° C.) | 0.75 |
| DPC | — | 167 | — | — |
| MPC | −49 | 130 | — | 0.9 |
| EPC | −81 | 148 | — | 0.92 (25° C.) |

From Table 1, it can be seen that the cyclic carbonates ethylene carbonate (EC) and vinylene carbonate (VC) have melting points higher than 0° C., as described in U.S. Pat. No. 5,712,059 to Barker et al. Therefore, while electrolytes prepared with these solvents perform well at room temperature, they may or may not work well at lower temperatures due to electrolyte freezing. Instead, the high dielectric constant solvents propylene carbonate (PC) and butylene carbonate (BC) are preferred for low temperature applications due to their low melting points. However, since those solvents can not passivate a graphite electrode during lithiation, they are not suitable for lithium ion cells comprising graphite as an anode active material. Thus, for graphite electrodes, EC and VC are still the best choice for use as the high dielectric constant solvent components.

All linear carbonate solvents other than DMC have melting points lower than −40° C. Unfortunately, they also have higher viscosities than that of DMC. For example, although DEC has a relatively low melting point of −43° C., that does not necessarily mean that an electrolyte prepared from DEC will result in high conductivity at low temperatures. As described in the Prior Art section, electrolytes consisting of 1.39M LiPF$_6$/EC:DEC=50:50 to 25:75 have freezing points higher than −15° C. (as reported by S. T. Mayer et al.).

Another factor which affects the cycleability of a lithium ion cell is the electrolyte stability toward the anode and the cathode It is known that the chemical composition of the electrolyte initially filled into the casing to activate the cell can undergo chemical reaction during charge/discharge cycling (as reported by E. S. Takeuchi, H. Gan, M. Palazzo, R. L. Leising and S. M. Davis, *J.Electrochem. Soc.* 144, 1944–1948, 1997). The reaction is represented in the following equation:

This phenomenon is largely avoided by starting with a carbonate solvent mixture which is already at an equilibration state. A method of preparing electrolytes of this type is fully described in U.S. patent application Ser. No. 08/865,236, titled "Method of Synthesizing Unsymmetrical Organic Carbonates and Preparing Nonaqueous Organic Electrolytes For Rechargeable Alkali Metal Cells", which is assigned to the assignee of the present invention and the disclose of which is incorporated herein by reference.

Therefore, in formulating a quaternary mixed solvent system for an electrolyte activating a lithium ion cell designed for low temperature applications wherein the electrolyte is at an equilibrium condition after preparation and will not undergo significant chemical composition variation during cell cycling, several factors were considered. These included the oxidative stability of the constituent carbonate solvents, the chemical stability of the equilibrated solvent mixture, the passivation effect of the electrolyte towards a graphite electrode, the freezing point of the electrolyte and the increased low temperature conductivity of the electrolyte. For typically used high dielectric constant (cyclic carbonate) solvents, ethylene carbonate is better than vinylene carbonate. With low viscosity (linear carbonate) solvents, the smaller the molecular size, the lower the solvent viscosity within the same class of compounds. Thus, DMC is better than EMC which is better than DEC.

Based on the above considerations, electrolytes according to the present invention comprise solvent mixtures of EC:DMC:EMC:DEC. Preferred volume percent ranges for the various carbonate solvents include EC in the range of about 10% to about 50%; DMC in the range of about 5% to about 75%; EMC in the range of about 5% to about 50%; and DEC in the range of about 3% to about 45%. Electrolytes containing this quaternary carbonate mixture exhibit freezing points below −50° C., and lithium ion cells activated with such mixtures have very good cycling behavior at room temperature as well as very good discharge and charge/discharge cycling behavior at temperatures below −20° C.

Known lithium salts that are useful as a vehicle for transport of alkali metal ions from the anode to the cathode, and back again include LiPF$_6$, LiBF$_4$, LiAsF$_6$, LiSbF$_6$, LiClO$_4$, LiAlCl$_4$, LiGaCl$_4$, LiC(SO$_2$CF$_3$)$_3$, LiNO$_3$, LiN(SO$_2$CF$_3$)$_2$, LiSCN, LiO$_3$SCF$_2$CF$_3$, LiC$_6$F$_5$SO$_3$, LiO$_2$CCF$_3$, LiSO$_3$F, LiB(C$_6$H$_5$)$_4$ and LiCF$_3$SO$_3$, and mixtures thereof. Suitable salt concentrations typically range between about 0.8 to 1.5 molar.

The assembly of the cell described herein is preferably in the form of a wound element cell. That is, the fabricated cathode, anode and separator are wound together in a "jellyroll" type configuration or "wound element cell stack" such that the anode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium or aluminum, but not limited thereto, so long as the metallic material is compatible for use with components of the cell.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The positive terminal pin feedthrough preferably comprises molybdenum although titanium, aluminum, nickel alloy, or stainless steel can also be used. The cell header comprises elements having compatibility with the other components of the electrochemical cell and is resistant to corrosion. The cathode lead is welded to the positive terminal pin in the glass-to-metal seal and the header is welded to the case containing the electrode stack. The cell is thereafter filled with the electrolyte solution described hereinabove, and hermetically sealed such as by close-welding a stainless steel ball over the fill hole, but not limited thereto. This above assembly describes a case-negative cell which is the preferred construction for the exemplary secondary cell of the present invention. As is well known to those skilled in the art, the electrochemical system of the present invention can also be constructed in a case-positive configuration.

The following examples describe the manner and process of an electrochemical cell according to the present invention, and they set forth the best mode contemplated by the inventors of carrying out the invention, but they are not to be construed as limiting.

EXAMPLE I

Carbonate Solvent Mixture Preparation

1. Mixture 1 Synthesis

A 2:1 molar ratio (volume ratio of 58:42) of DMC (116 ml) and DEC (84 ml) was mixed in a 500 ml flask. A catalyst of 0.1 g $LiOCH_3$ was added to the mixture which was then refluxed for 12 hours. Gas chromatography (GC) analysis indicated that the reaction mixture reached equilibration with a DMC:EMC:DEC volume ratio of 40:45:15. The reaction mixture was then filtered through 47 mm of a Glass Fiber Filter, Type A/E (from Gelman Science). Clear solution (Mixture 1) was obtained.

2. Mixture 2 Synthesis

A 1:1 molar ratio (volume ratio 41:59) of DMC (82 ml) and DEC (118 ml) was mixed in a 500 ml flask. A catalyst of 0.1 g $LiOCH_3$ was added to the mixture which was then refluxed for 12 hours. Gas chromatography (GC) analysis indicated that the reaction mixture reached equilibration with a DMC:EMC:DEC volume ratio of 20:50:30. The reaction mixture was then filtered through 47 mm of a Glass Fiber Filter, Type A/E (from Gelman Science). Clear solution (Mixture 2) was obtained.

The above examples demonstrate a synthetic method. The final volume ratio of the equilibrated solvent mixture can be adjusted by varying the ratio of the initial solvent constituents. For example, the ratio of EMC in the final reaction mixture can range from about 41% to about 48% for starting ratios of DMC:DEC of about 4:2 to 2:4, respectively. In addition, the final solvent mixture ratio can also be modified to a non-equilibrated mixture by adding an additional amount of at least one of the solvent components. As is apparent to those skilled in the art, the solvent mixtures can also be prepared by mixing the appropriate amount of pure DMC, EMC and DEC.

EXAMPLE II

Electrolyte Preparation and Their Properties

Eight new electrolytes were prepared by mixing EC with Mixture 1 or Mixture 2 in the volume ratio of 2:8, 3:7, 4:6, and 5:5. A conventional electrolyte was also prepared for comparison, as summarized in Table 2.

TABLE 2

| Electrolyte | [LiAsF$_6$] M | [LiPF$_6$] M | Solvent Ratio EC:DMC:EMC:DEC |
|---|---|---|---|
| 1 | 1.0 | | 20:32:36:12 |
| 2 | 1.0 | | 30:28:32:10 |
| 3 | 1.0 | | 40:24:27:9 |
| 4 | 1.0 | | 50:20:23:7 |
| 5 | 1.0 | | 20:16:40:24 |
| 6 | 1.0 | | 30:14:35:21 |
| 7 | 1.0 | | 40:12:30:18 |
| 8 | 1.0 | | 50:10:25:15 |
| 9 | | 1.0 | 30:70 |

The conductivity of these electrolytes was recorded at temperatures ranging from −20° C. to 50° C. with a YSI Model 32 Conductivity Meter. The results are summarized in Table 3.

TABLE 3

| | Electrolyte Conductivity (mS) | | | | | | | |
|---|---|---|---|---|---|---|---|---|
| Electrolyte | −20° C. | −10° C. | 0° C. | 10° C. | 20° C. | 30° C. | 40° C. | 50° C. |
| 1 | 3.04 | 4.22 | 5.59 | 6.95 | 8.59 | 10.01 | 11.80 | 13.35 |
| 2 | 2.71 | 4.13 | 5.64 | 7.06 | 8.91 | 10.72 | 12.38 | 14.07 |
| 3 | 2.71 | 3.93 | 5.40 | 7.20 | 8.96 | 10.87 | 12.80 | 14.76 |
| 4 | 2.32 | 3.51 | 4.98 | 6.73 | 8.55 | 10.65 | 12.75 | 14.89 |
| 5 | 2.73 | 3.70 | 4.94 | 6.55 | 7.98 | 9.45 | 10.87 | 12.25 |
| 6 | 2.73 | 3.81 | 5.13 | 6.60 | 8.33 | 10.12 | 11.82 | 13.62 |
| 7 | 2.45 | 3.68 | 5.06 | 6.73 | 8.45 | 10.25 | 12.00 | 13.93 |
| 8 | Freeze | 3.48 | 4.77 | 6.35 | 8.23 | 10.18 | 12.19 | 14.23 |
| 9 | Freeze | 5.19 | 6.90 | 8.79 | 10.74 | 12.72 | 14.62 | 16.48 |

The above results show that the conventional electrolyte 9 presented higher conductivities than that of the new formulated electrolytes at all temperatures, except at −20° C. At −20° C., electrolyte 9 froze, which makes it unusable. Unexpectedly, electrolyte 8 also froze at −20° C., however, electrolyte 4 which contained 50%, by volume, EC, as did electrolyte 8, did not freeze at the same temperature. Comparing these two electrolytes, electrolyte 4 contained more DMC (MP of 3° C.) and less DEC (MP of −43° C.) than that of electrolyte 8. This demonstrates that the electrolyte freezing point of a quaternary carbonate is not directly proportional to the percentage of the lowest melting point solvent component. The conductivity results also indicate that at low temperatures, electrolyte conductivity is inversely proportional to the EC percentage. In other words, the lower the EC percentage, the higher the electrolyte conductivity. Additionally, in comparing electrolytes having similar percentages of EC, electrolyte conductivity is proportional to the DMC concentration (electrolytes 1 vs. 5; 2 vs. 6; 3 vs. 7; 4 vs. 8). This is consistent with the consideration that the smaller the linear carbonate molecular size, the lower the solvent viscosity and the higher the electrolyte conductivity.

The freezing points of the above electrolytes 1 to 9 were also investigated and summarized in Table 4.

TABLE 4

| Electrolyte Freezing Point Evaluation | |
|---|---|
| Electrolyte | Freezing Point |
| 1 | −55° C. < −50° C. |
| 2 | −60° C. < −55° C. |
| 3 | <−32° C. |
| 4 | −25° C. |
| 5 | −75° C. < −60° C. |
| 6 | −75° C. < −60° C. |
| 7 | <−32° C. |
| 8 | −15° C. |
| 9 | −11° C. |

The above test results demonstrate that electrolytes 8 and 9 can not be used in lithium ion cells for low temperature (<−15° C.) applications. All of the other electrolytes can be used in lithium ion cells at or below −20° C.

EXAMPLE III

Lithium Ion Cell Preparation and Electrochemical Testing

1. Cell Preparation

The cathode was prepared by casting a $LiCoO_2$ cathode mixture on aluminum foil. The cathode mix contained 91% $LiCoO_2$, 6% graphite additive and 3% PVDF binder. The anode was prepared similarly by casting an anode mixture containing 91.7% graphite and 8.3% PVDF binder on a copper foil. An electrode assembly was obtained by placing one layer of polyethylene separator between the cathode and the anode and the assembly was spirally wounded into a jellyroll configuration and housed inside of an AA sized cylindrical stainless steel casing. Various groups of AA cells were obtained by activating the electrode assemblies with six different electrolytes, as shown in Table 5.

TABLE 5

| Group | Electrolyte (#) | # of cells |
|---|---|---|
| 1 | 1.0M $LiPF_6$/EC:DMC = 30:70 (#9) | 5 |
| 2 | 1.0M $LiAsF_6$/EC:DMC = 30:70 | 5 |
| 3 | 1.0M $LiAsF_6$/EC:DMC:EMC:DEC = 20:16:40:24 (#5) | 5 |
| 4 | 1.0M $LiAsF_6$/EC:DMC:EMC:DEC = 30:14:35:21 (#6) | 4 |
| 5 | 1.0M $LiAsF_6$/EC:DMC:EMC:DEC = 20:32:36:12 (#1) | 4 |
| 6 | 1.0M $LiAsF_6$/EC:DMC:EMC:DEC = 30:28:32:10 (#2) | 5 |

2. Room Temperature Cycling Test

Figure 1:
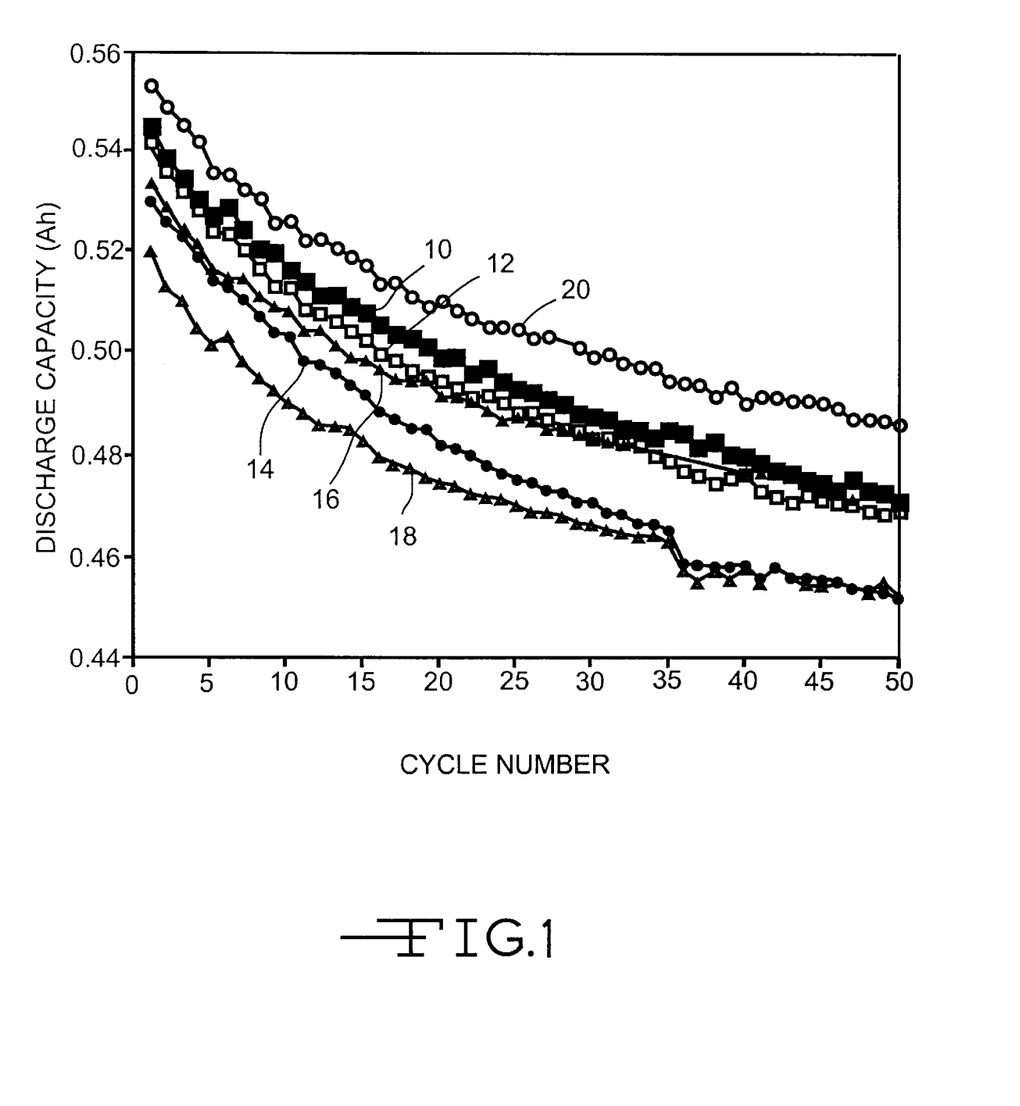
FIG. 1 is a graph constructed from the cycling results of representative lithium ion cells activated with various electrolytes according to the prior art and to the present invention.

The thusly fabricated cells were charge/discharge cycled between 4.1V and 2.75V under a 0.14C discharge rate (1C rate=520 mA) at room temperature. The cells were charged under a 0.14C rate to 4.1V and then the cells were held at that voltage until the current dropped to 10% of the original current. The cycling results of each group of cells are shown in FIG. 1 and summarized in Table 6.

TABLE 6

| | Discharge Capacity (mAh) | | | Capacity Retention (%) at 50th Cycle | |
|---|---|---|---|---|---|
| Group* | Cycle 1 | Cycle 10 | Cycle 50 | vs. Cycle 1 | vs. Cycle 10 |
| 1 | 545 | 510 | 461 | 84.6 | 90.4 |
| 2 | 530 | 505 | 461 | 87.0 | 91.3 |
| 3 | 525 | 507 | 464 | 88.4 | 91.5 |
| 4 | 525 | 498 | 462 | 88.0 | 92.8 |
| 5 | 520 | 492 | 453 | 87.1 | 92.1 |
| 6 | 538 | 512 | 478 | 88.8 | 93.4 |

*Data for groups 1, 2, 3 and 6 are the average of 5 cells. Data for groups 4 and 5 are the average of 4 cells.

In FIG. 1, respective curves 10, 12, 14, 16, 18 and 20 were constructed from the representative cycling results of the groups 1 to 6 cells. As can be seen, all six groups of cells exhibited similar cycling characteristics. In particular, the groups 3 to 6 cells activated with an electrolyte comprising a quaternary mixture of nonaqueous organic carbonate solvents according to the present invention presented similar cycling performance as that of the groups 1 and 2 cells with conventional binary solvent electrolytes.

3. Discharge Rate Capability at Various Temperatures

After the cycling test, the AA cells were charged at room temperature, then they were discharged under various C-rates at room temperature; 0° C., −20° C. and −40° C. Three cells were used in each of the tests except for the room temperature test which used five cells. Assuming a room temperature discharge rate capacity of 0.14C as a 100% standard, the relative discharge efficiencies of all the other discharge conditions were calculated. The results are shown in FIGS. 2 to 5 and summarized in Tables 7 to 10, respectively.

TABLE 7

Discharge Rate Efficiency at Room Temperature (%)*

| Group | 2.23 C. | 1.12 C. | 0.56 C. | 0.28 C. | 0.14 C. | 0.07 C. | 0.03 C. |
|---|---|---|---|---|---|---|---|
| 1 | 32.7 | 82.4 | 95.5 | 98.8 | 100.0 | — | — |
| 2 | 39.4 | 86.3 | 95.5 | 98.7 | 100.0 | — | — |
| 3 | 20.4 | 69.0 | 93.6 | 98.1 | 100.0 | — | — |
| 4 | 24.3 | 73.3 | 94.7 | 98.6 | 100.0 | — | — |
| 5 | 28.5 | 78.7 | 94.5 | 98.3 | 100.0 | — | — |
| 6 | 30.4 | 84.7 | 96.3 | 98.9 | 100.0 | — | — |

*Average data of 5 cells. 1 C. rate = 520 mA discharge rate

TABLE 8

Discharge Rate Efficiency at 0° C. (%)*

| Group | 2.23 C. | 1.12 C. | 0.56 C. | 0.28 C. | 0.14 C. | 0.07 C. | 0.03 C. |
|---|---|---|---|---|---|---|---|
| 1 | — | 55.6 | 84.8 | 91.0 | 93.2 | 94.5 | — |
| 2 | — | 54.5 | 81.9 | 89.6 | 92.8 | 94.5 | — |
| 3 | — | 34.7 | 75.8 | 89.7 | 93.8 | 95.5 | — |
| 4 | — | 38.8 | 75.4 | 89.0 | 93.2 | 95.0 | — |
| 5 | — | 43.4 | 80.9 | 90.0 | 93.3 | 94.8 | — |
| 6 | — | 46.8 | 84.5 | 91.8 | 94.3 | 95.4 | — |

*Average data of 3 cells. 1 C. rate = 520 mA discharge rate.

TABLE 9

Discharge Rate Efficiency at −20° C. (%)*

| Group | 2.23 C. | 1.12 C. | 0.56 C. | 0.28 C. | 0.14 C. | 0.07 C. | 0.03 C. |
|---|---|---|---|---|---|---|---|
| 1 | — | — | 4.6 | 6.0 | 6.7 | 7.4 | 8.5 |
| 2 | — | — | 3.6 | 4.9 | 5.7 | 6.4 | 7.7 |
| 3 | — | — | 9.2 | 66.0 | 85.3 | 91.2 | 94.7 |
| 4 | — | — | 12.0 | 61.7 | 79.7 | 87.8 | 92.8 |
| 5 | — | — | 25.2 | 72.8 | 86.5 | 91.0 | 93.7 |
| 6 | — | — | 26.2 | 71.5 | 85.5 | 90.5 | 93.7 |

*Average data of 3 cells. 1 C. rate = 520 mA discharge rate.

TABLE 10

Discharge Rate Efficiency at −40° C. (%)*

| Group | 2.23 C. | 1.12 C. | 0.56 C. | 0.28 C. | 0.14 C. | 0.07 C. | 0.03 C. |
|---|---|---|---|---|---|---|---|
| 1 | — | — | 0.0 | 0.0 | 0.0 | 0.0 | 0 |
| 2 | — | — | 0.0 | 0.0 | 0.0 | 0.0 | 0 |
| 3 | — | — | 0.0 | 0.1 | 2.7 | 29.7 | 72 |
| 4 | — | — | 0.0 | 0.0 | 0.0 | 0.1 | 7.5 |
| 5 | — | — | 0.0 | 0.2 | 6.2 | 49.5 | 80.6 |
| 6 | — | — | 0.0 | 0.0 | 0.0 | 3.1 | 71.5 |

*Average data of 3 cells. 1 C. rate = 520 mA discharge rate.

Figure 2:
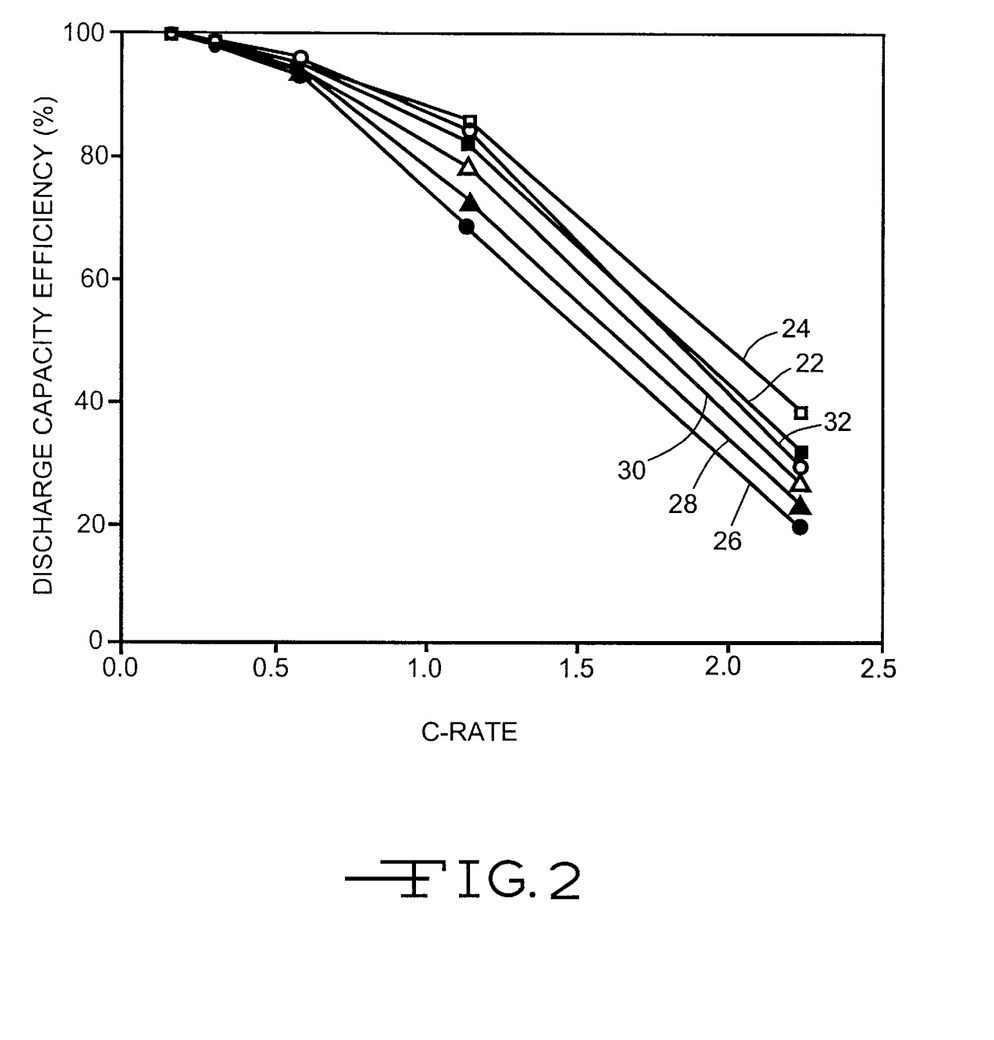
FIGS. 2 to 5 are graphs constructed from the average discharge rate efficiency of the cells of FIG. 1 discharged at room temperature, 0° C., -20° C. and -40° C.

In FIG. 2, respective curves 22, 24, 26, 28, 30 and 32 were constructed from the average discharge rate efficiency of the groups 1 to 6 cells at room temperature. FIG. 2 demonstrates that the groups 1 and 2 prior art cells activated with binary solvent electrolytes afforded better discharge rate capability than that of the groups 3 to 6 present invention cells at room temperature under discharge rates greater than >0.5C. At discharge rates lower than 0.5C, all groups of cells presented similar discharge efficiency.

Figure 3:
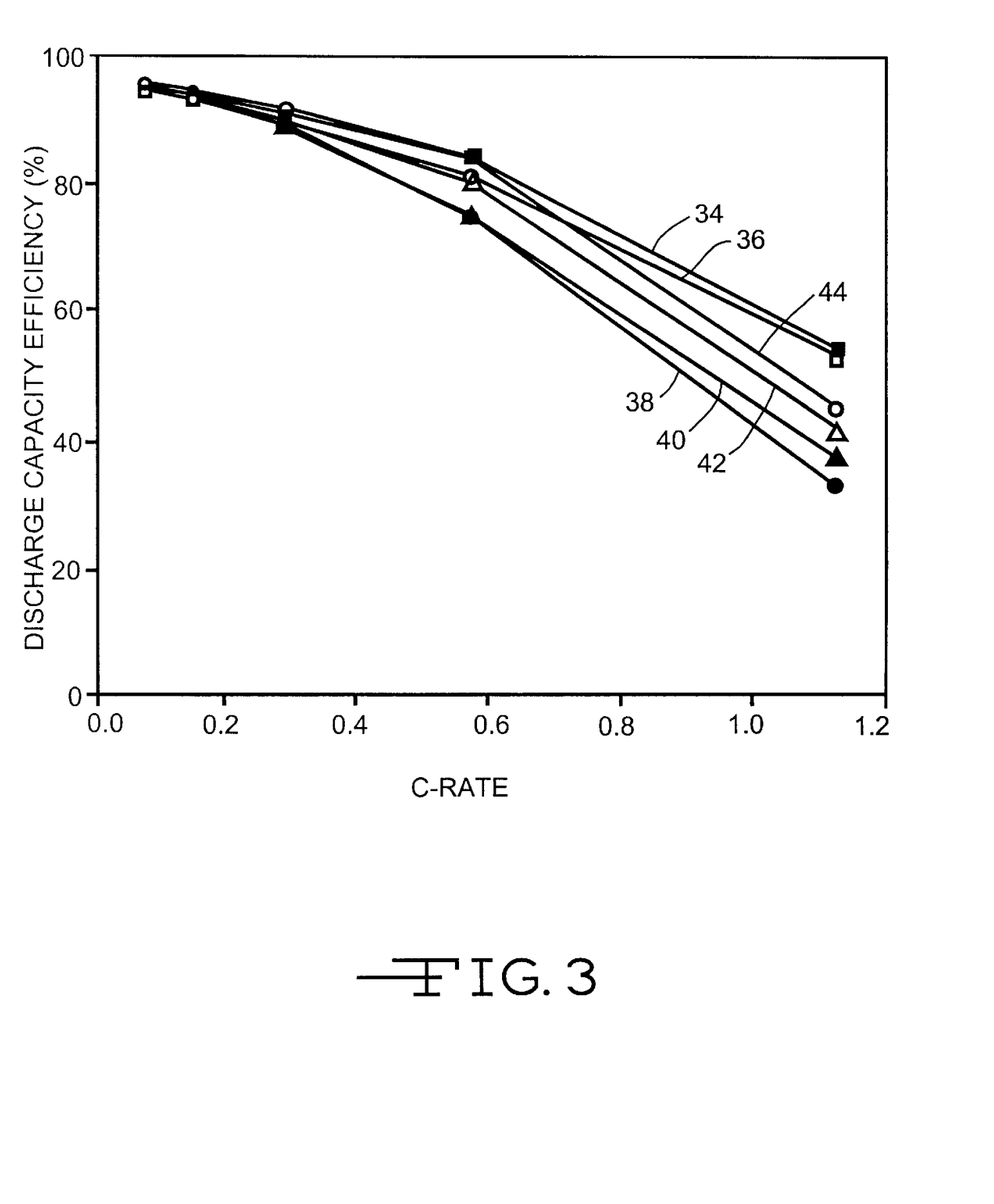

In FIG. 3, respective curves 34, 36, 38, 40, 42, 44 and 46 were constructed from the average discharge rate efficiency of the groups 1 to 6 cells at 0° C. FIG. 3 demonstrates that the groups 1 and 2 prior art cells activated with binary solvent electrolytes still afforded better discharge rate capability than that of the groups 3 to 6 present invention cells at 0° C. under a discharge rate greater than >0.5C. At a discharge rate lower than 0.5C, all groups of cells presented similar discharge efficiency.

Figure 4:
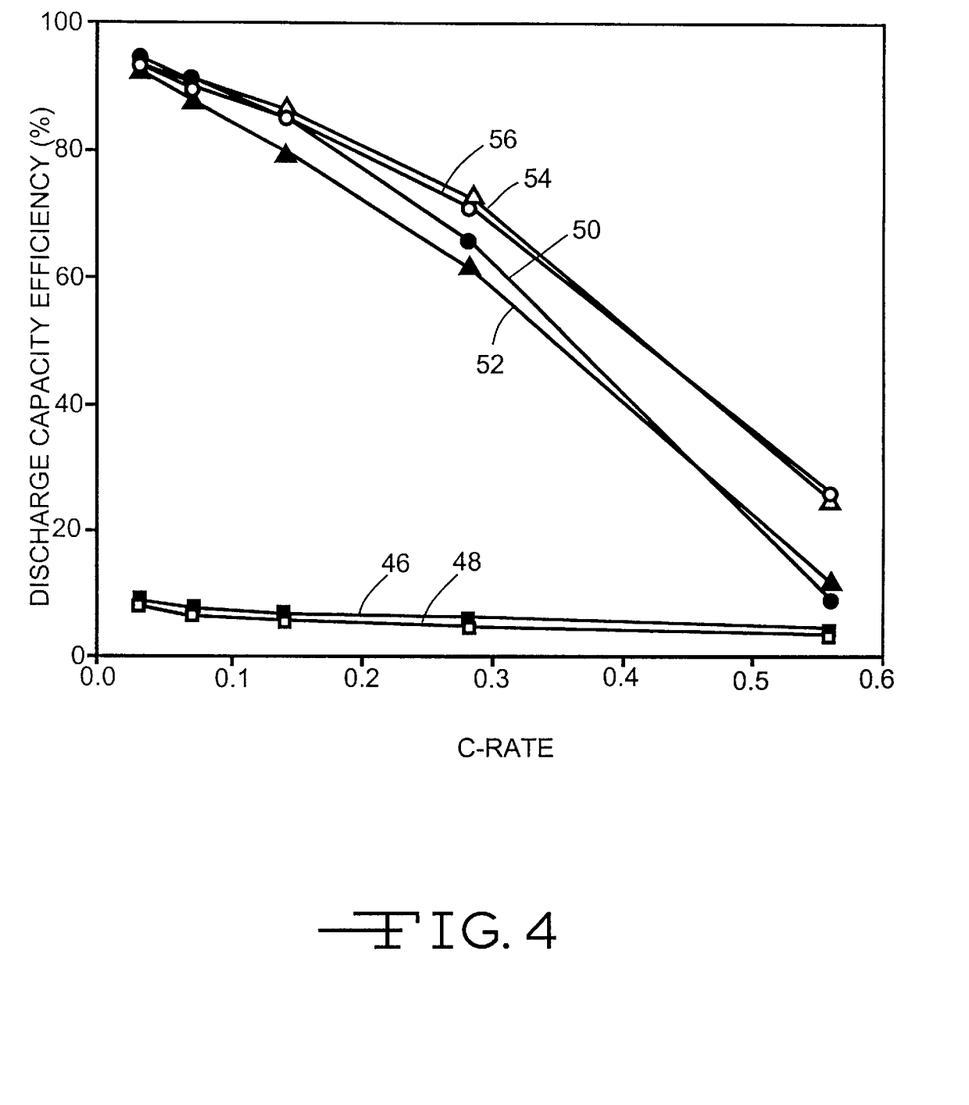

In FIG. 4, respective curves 46, 48, 50, 52, 54 and 56 were constructed from the average discharge rate efficiency of the groups 1 to 6 cells at −20° C. FIG. 4 demonstrates that at −20° C., the groups 1 and 2 prior art cells activated with the binary solvent electrolytes afforded no realistic discharge capacity. This is consistent with the observation that electrolyte 9 freezes at −11° C. In contrast, the groups 3 to 6 cells activated with a quaternary mixture of nonaqueous organic carbonate solvents according to the present invention delivered good discharge efficiencies under all rates tested. The results also demonstrate that the groups 5 and 6 cells activated with the present invention electrolytes 1 and 2 appear to have higher discharge rate capability than that of the groups 3 and 4 cells activated with present invention electrolytes 5 and 6.

Figure 5:
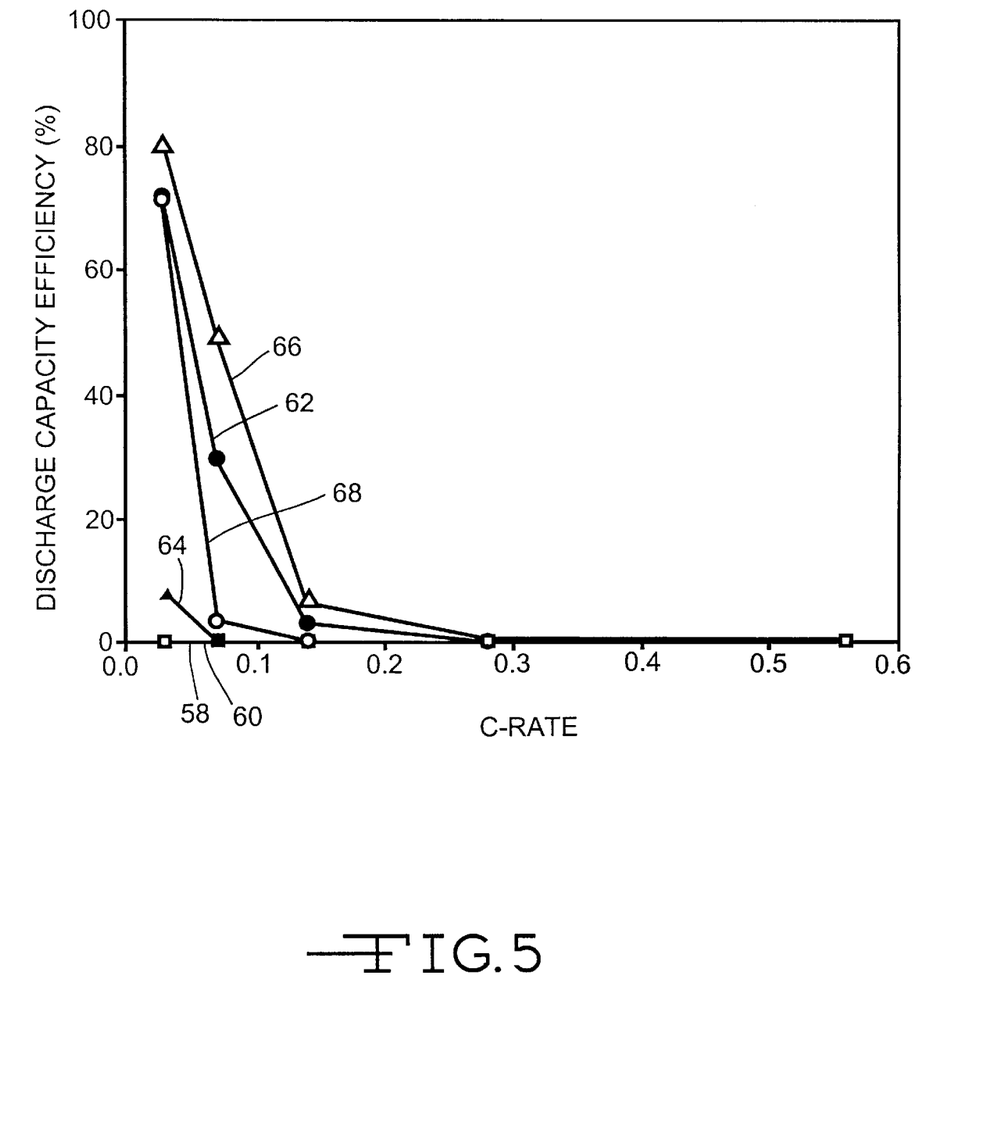

In FIG. 5, respective curves 58, 60, 62, 64, 66 and 68 were constructed from the average discharge rate efficiency of the groups 1 to 6 cells at −40° C. At that temperature, none of the cells from groups 1 to 6 was capable of delivering any appreciable capacity above the 0.1C discharge rate. Under a lower discharge rate, the groups 1 and 2 prior art cells still were not capable of delivering any appreciable capacity. In contrast, the groups 3, 5 and 6 present invention cells presented fairly high discharge efficiencies.

The test results in this example clearly demonstrate the effect electrolyte chemistry has on lithium ion cell discharge efficiency at low temperatures. Cells activated with electrolytes comprising a quaternary mixture of nonaqueous organic carbonate solvents according to the present invention gave comparable discharge capacity at room temperature and 0° C. with respect to cells of a similar electrode chemistry activated with prior art electrolytes. In addition, they provide superior discharge rate at capability over the cells with the conventional binary solvent electrolytes at or below −20° C. At or below −20° C., the groups 1 and 2 prior art cells cannot be discharged.

EXAMPLE IV

Charge/Discharge Cycling at Low Temperatures

After low temperature discharge rate capability tests, the cells constructed in Example III were cycle tested at 0° C. and −20° C. under a discharge rate of 0.14C. Since the groups 1 and 2 prior art cells are known to be incapable of discharging at −20° C., they were only tested at room temperature and at 0° C. All other groups of cells were tested at room temperature, 0° C. and −20° C.

The groups 1 and 2 prior art cells were first cycled three times at room temperature. Then they were equilibrated at 0° C. for 24 hours before cycling for another three times. Finally, they were cycled three more times at room temperature. For the groups 3 to 6 present invention cells, similar procedures were used except that before the 0° C. test, the cells were tested at −20° C.

Figure 6:
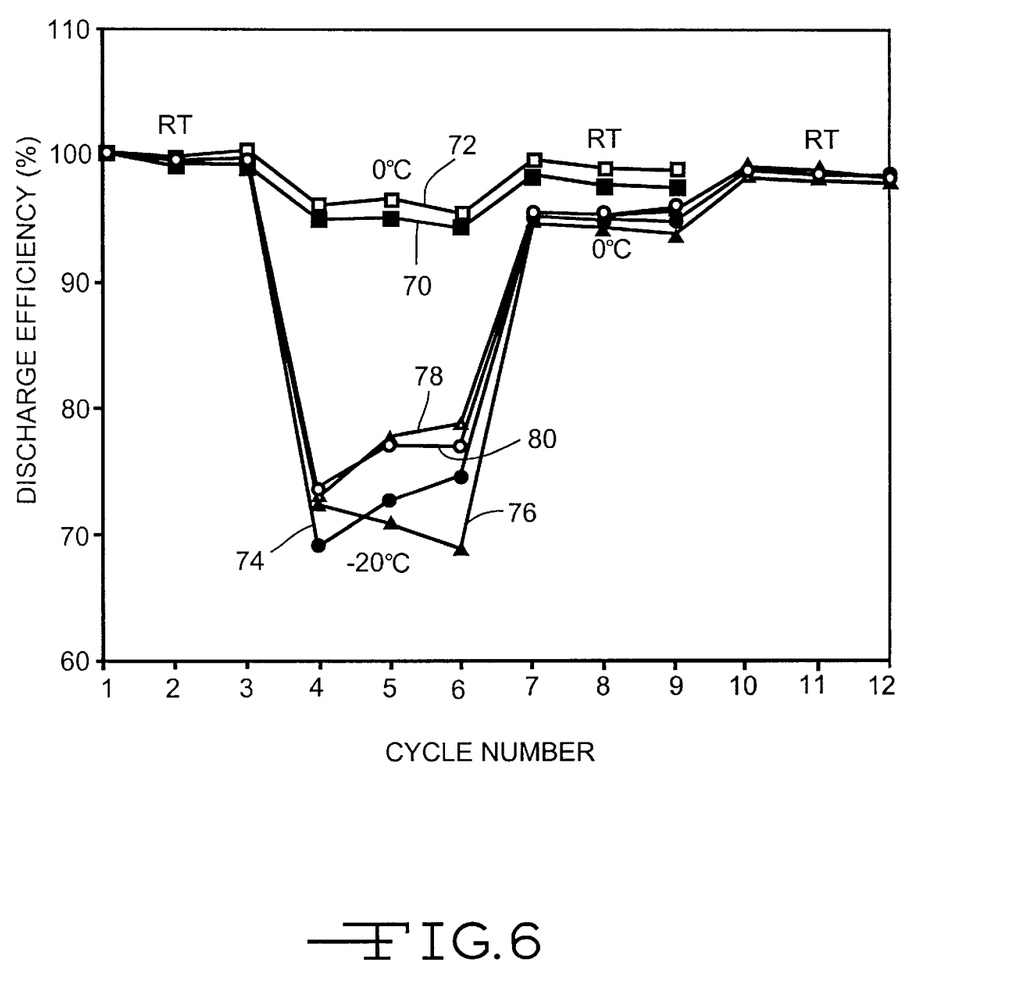
FIG. 6 is a graph constructed from the average discharge efficiency of the cells discharged in FIG. 1 cycled at various temperatures.

Assuming a room temperature first discharge cycle capacity as a 100% standard, the efficiencies of all other cycles were calculated. The results are summarized in FIG. 6, wherein respective curves 70, 72, 74, 76, 78 and 80 were constructed from the average discharge efficiency of the group 1 to 6 cells. For all groups of cells, about 95% of room temperature discharge capacity was realized at 0° C. cycling. For the groups 3 and 4 cells, about 70% of room temperature discharge capacity was realized at 20° C. cycling. For the groups 5 and 6 cells, about 75% of room temperature discharge capacity was realized at 20° C. The results illustrate that lithium ion cells activated with an electrolyte comprising a quaternary mixture of nonaqueous organic carbonate solvents according to the present invention are capable of being charge/discharge cycled at low temperature with good capacity efficiency.

EXAMPLE V

Self-Discharge and the Rate of Capacity Recovery

After the room temperature discharge rate capability test described in Example III, section 3, two cells from each of groups 1, 2, 3 and 6 and one cell from groups 4 and 5 were placed on self-discharge test. The cells were cycled between 4.1V and 2.75V once under a 0.14C discharge rate (defined as a first cycle), followed by charging them to the fully charged state (defined as a second cycle-charging). Then, the cells were stored on open circuit at room temperature for 30 days, followed by discharging (defined as a second cycle after storage-discharging). The cells were then cycled once more (defined as a third cycle). The self-discharge rate was calculated from the ratio of the capacity difference between the first cycle discharge and the second cycle after storage-discharge over the first cycle discharge capacity. The rate of capacity recovery was calculated from the ratio of the third cycle discharge capacity divided by the first cycle discharge capacity. The results are summarized in Table 11.

TABLE 11

Self-Discharge and Recovery Rate of Capacity

| Group | Self-Discharge (%) | Capacity Recovery (%) |
|---|---|---|
| 1* | 18.8 | 86.7 |
| 2* | 13.8 | 91.0 |
| 3* | 13.0 | 90.3 |
| 4 | 14.2 | 88.9 |
| 5 | 19.1 | 82.3 |
| 6* | 13.1 | 90.3 |

*Average data of two cells.

The data in Table 11 indicates that other than the group 5 cells which exhibited a self-discharge rate similar to that of the group 1 prior art cells, all of the other groups of cells exhibited a lower self-discharge rate than that of the group 1 cells. The same trend was also observed for the capacity recovery rate. This example demonstrates that lithium ion cells activated with an electrolyte comprising a quaternary mixture of nonaqueous organic carbonate solvents according to the present invention present similar or lower self-discharge rates relative to that of cells activated with a binary solvent electrolyte according to the prior art. The capacity recovery rate after self-discharge test is also comparable among all groups of cells.

From the above examples, it is clearly demonstrated that lithium ion cells activated with electrolytes comprising a quaternary mixture of nonaqueous organic carbonate solvents according to the present invention exhibit similar cycling behavior and superior low temperature charge/discharge capability relative to that of cells of a similar electrode chemistry activated with conventional binary solvent electrolytes.

It is appreciated that various modifications to the present inventive concepts described herein may be apparent to those of ordinary skill in the art without departing from the spirit and scope of the present invention as defined by the herein appended claims.

What is claimed is:

1. A method for providing an electrochemical cell, comprising the steps of:
   a) mixing dimethyl carbonate and diethyl carbonate together in the presence of a catalyst to thereby provide an equilibrated first solvent mixture of dimethyl carbonate, ethylmethyl carbonate and diethyl carbonate;
   b) mixing ethylene carbonate with the first solvent mixture to provide a second solvent mixture comprising dimethyl carbonate in the range of about 12% to about 75%, ethylmethyl carbonate in the range of about 5% to about 50%, diethyl carbonate in the range of about 3% to about 45% and ethylene carbonate in the range of about 10% to about 50%, by volume;
   c) dissolving a lithium salt in the second solvent mixture to provide an electrolyte; and
   d) activating a negative electrode which intercalates with lithium and an associate positive electrode which intercalates with lithium, and wherein the electrochemical cell is dischargeable at a temperature below −20° C.

* * * * *

UNITED STATES PATENT AND TRADEMARK OFFICE
CERTIFICATE OF CORRECTION

PATENT NO. : 6,153,338
DATED : Nov. 28, 2000
INVENTOR(S) : Gan et al.

It is certified that error appears in the above-identified patent and that said Letters Patent is hereby corrected as shown below:

Cover page, item [60] - "60/065,532" should be -- 60/085,532 --.

Signed and Sealed this

Fifteenth Day of May, 2001

Attest:

NICHOLAS P. GODICI

*Attesting Officer*     *Acting Director of the United States Patent and Trademark Office*